United States Patent
Tseng et al.

(10) Patent No.: US 12,365,101 B2
(45) Date of Patent: Jul. 22, 2025

(54) WRIST MECHANISM FOR A MECHANICAL ARM

(71) Applicant: Toyo Automation Co., Ltd., Tainan (TW)

(72) Inventors: Kun-Cheng Tseng, Tainan (TW); Yi-An Chen, Tainan (TW); Fong-Ting Yan, Tainan (TW); Chung-Ho Chen, Tainan (TW)

(73) Assignee: TOYO AUTOMATION CO., LTD., Tainan (TW)

( * ) Notice: Subject to any disclaimer, the term of this patent is extended or adjusted under 35 U.S.C. 154(b) by 0 days.

(21) Appl. No.: 18/623,650

(22) Filed: Apr. 1, 2024

(65) Prior Publication Data

US 2025/0214262 A1 Jul. 3, 2025

(30) Foreign Application Priority Data

Jan. 2, 2024 (TW) .................................. 113100048

(51) Int. Cl.
*B25J 17/02* (2006.01)
*B25J 13/08* (2006.01)
(Continued)

(52) U.S. Cl.
CPC ......... *B25J 17/0258* (2013.01); *B25J 13/088* (2013.01); *B25J 19/0004* (2013.01); *F16D 55/02* (2013.01); *F16D 65/18* (2013.01); *G05B 19/4155* (2013.01); *F16D 2121/22* (2013.01); *G05B 2219/34429* (2013.01)

(58) Field of Classification Search
CPC .... B25J 17/02; B25J 17/0258; B25J 19/0004; B25J 13/088
See application file for complete search history.

(56) References Cited

U.S. PATENT DOCUMENTS 4,502,347 A * 3/1985 Norris ................. B25J 17/0283
74/665 F
4,685,861 A * 8/1987 Huetsch ................... B25J 9/046
901/26
(Continued)

FOREIGN PATENT DOCUMENTS

CN 113500625 A * 10/2021

OTHER PUBLICATIONS

CN-113500625-A Machine Translation (Year: 2021).*

*Primary Examiner* — Jake Cook
(74) *Attorney, Agent, or Firm* — MUNCY, GEISSLER, OLDS & LOWE, P.C.

(57) ABSTRACT

A wrist mechanism includes a first rotation unit, a second rotation unit, a first brake pad, and a first brake plate. The first rotation unit includes a first motor, a first rotating shaft that is connected to the first motor, and a first encoder. The first motor is operable to drive the first rotating shaft to rotate about a first axis. The first encoder measures an angle of rotation of the first rotating shaft. The second rotation unit is co-rotatable with the first rotating shaft about the first axis. The first brake pad is connected to the first rotating shaft. The first brake plate is operable to move relative to the first brake pad along the first axis. When the first brake plate is urged to move along the first axis to abut against the first brake pad, the rotation of the first rotating shaft is stopped.

20 Claims, 13 Drawing Sheets

(51) Int. Cl.
*B25J 19/00* (2006.01)
*F16D 55/02* (2006.01)
*F16D 65/18* (2006.01)
*F16D 121/22* (2012.01)
*G05B 19/4155* (2006.01)

(56) References Cited

U.S. PATENT DOCUMENTS

| | | | | |
|---|---|---|---|---|
| 4,846,015 | A * | 7/1989 | Keppler | B25J 9/102 901/29 |
| 5,231,889 | A * | 8/1993 | Lee | B25J 17/025 901/29 |
| 8,210,069 | B2 * | 7/2012 | Chen | B25J 17/0258 901/29 |
| 8,360,408 | B2 * | 1/2013 | Bereznicki | B25J 19/0004 187/373 |
| 2011/0048157 | A1 * | 3/2011 | Long | B25J 9/1025 74/490.03 |

* cited by examiner

WRIST MECHANISM FOR A MECHANICAL ARM

CROSS-REFERENCE TO RELATED APPLICATION

This application claims priority to Taiwanese Invention Patent Application No. 113100048, filed on Jan. 2, 2024, the entire disclosure of which is incorporated by reference herein.

FIELD

The disclosure relates to a mechanism for a mechanical arm, and more particularly to a wrist mechanism for a mechanical arm.

BACKGROUND

Referring to FIG. 1, a conventional wrist unit for an industrial robot is disclosed in Taiwanese Patent No. 1418452B. The conventional wrist unit includes an arm member 91, a first rotation assembly 92, a wrist body 93, and a second rotation assembly 94. The first rotation assembly 92 is disposed in the arm member 91, and includes a first motor 921, a first reduction device 922, and a transmission mechanism 923. The first motor 921 includes an output shaft 924. The first reduction device 922 includes an input shaft 925 and an output shaft 926. The transmission mechanism 923 includes a first belt pulley 927, a second belt pulley 928, and a belt 929. The first belt pulley 927 is mounted to the output shaft 924 of the first motor 921. The second belt pulley 928 is mounted to the input shaft 925 of the first reduction device 922. The belt 929 is sleeved around the first and second belt pulleys 927, 928 so as to transmit power that is generated by rotation of the first motor 921 from the first motor 921 to the first reduction device 922. The wrist body 93 is mounted to the arm member 91, and is connected to the output shaft 926 of the first reduction device 922 so that the output shaft 926 of the first reduction device 922 may urge the wrist body 93 to rotate about a first rotation axis (L1). The second rotation assembly 94 includes a second motor 941, a connection seat 942, and a second reduction device 943. The second motor 941 is disposed in the wrist body 93, and includes an output shaft 944. The connection seat 942 interconnects the second motor 941 and the second reduction device 943. Power that is generated by rotation of the second motor 941 is transmitted to the second reduction device 943 so that the second reduction device 943 may urge a workpiece (not shown) that is mounted thereto to rotate about a second rotation axis (L2).

However, because the power in the conventional wrist unit for the industrial robot is transmitted by the first belt pulley 927, the second belt pulley 928, and the belt 929, if the belt 929 becomes loosened or slips during the transmission of the power, the conventional wrist unit may not function well. When the belt 929 loses its elasticity or tightness, when the belt 929 is worn, or when tension of the belt 929 is uneven, transmission accuracy of the power may be reduced, thereby reducing rotation accuracy of the wrist body 93 as the wrist body 93 rotates about the first rotation axis (L1). In addition, structures of the first belt pulley 927, the second belt pulley 928, the belt 929, the first reduction device 922, and the second reduction device 943 make size of the conventional wrist unit too big. Consequently, the conventional wrist unit may not satisfy requirements for being highly precise in motion or minimized in size.

SUMMARY

Therefore, an object of the disclosure is to provide a wrist mechanism that can alleviate at least one of the drawbacks of the prior art.

According to the disclosure, the wrist mechanism includes a housing unit, a first rotation unit, a second rotation unit, and a first brake unit. The first rotation unit includes a first motor that is disposed in the housing unit, a first rotating shaft that is connected to the first motor, and a first encoder. The first motor is operable to drive the first rotating shaft to rotate about a first axis. The first encoder measures an angle of rotation of the first rotating shaft, and controls the first motor via closed-loop control. The second rotation unit is disposed on the first rotating shaft, and is co-rotatable with the first rotating shaft about the first axis. The second rotation unit includes a second motor, and a work platform that is connected to the second motor. The second motor is operable to drive the work platform to rotate about a second axis that is orthogonal to the first axis. The first brake unit includes a first brake pad that is connected to the first rotating shaft, and a first brake plate that is operable to move relative to the first brake pad along the first axis. When the first brake plate is urged to move along the first axis to abut against the first brake pad, the rotation of the first rotating shaft is stopped.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
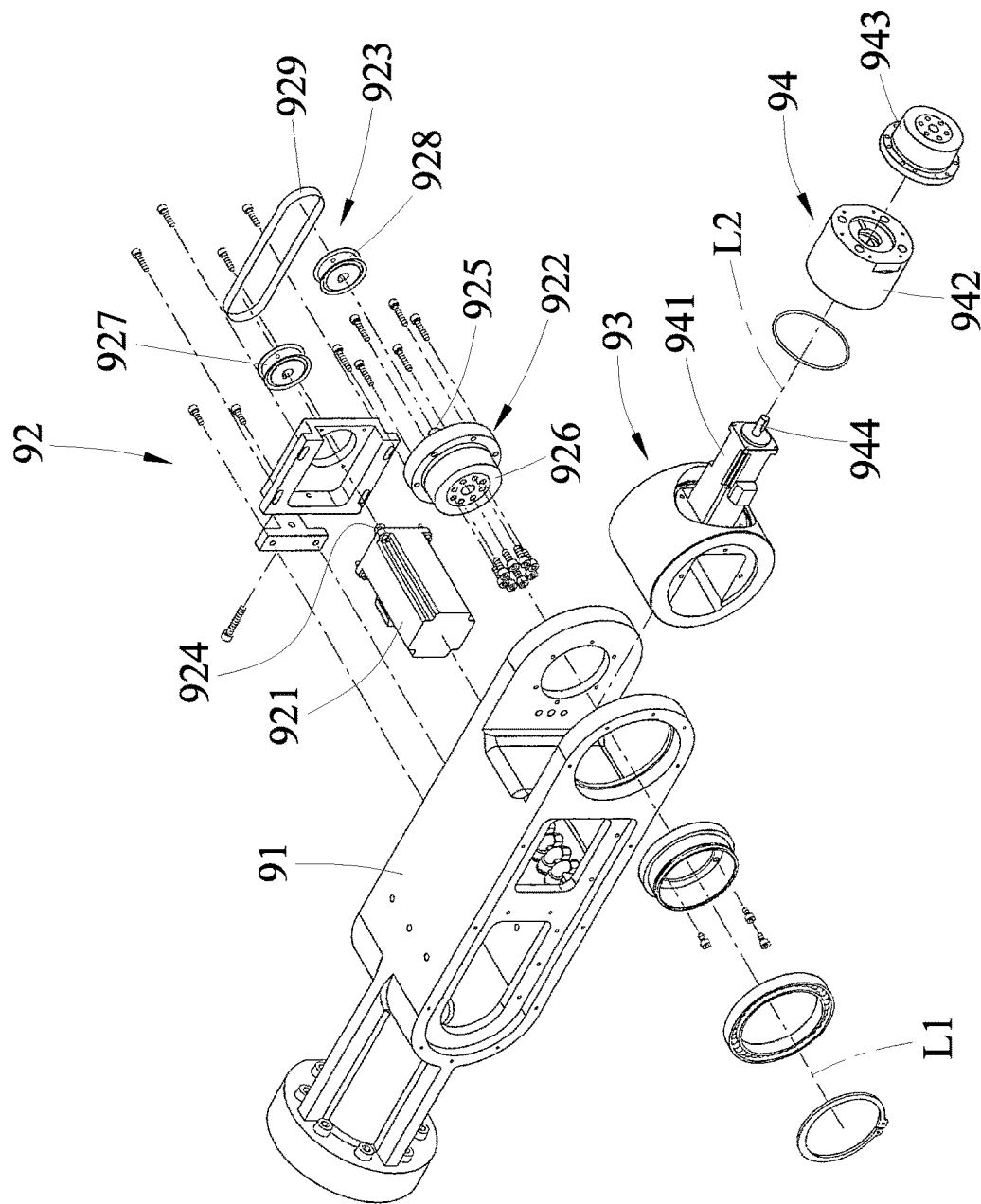
FIG. 1 is a partly exploded perspective view of a conventional wrist unit for an industrial robot.

It should be noted herein that for clarity of description, spatially relative terms such as "top," "bottom," "upper,"

"lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
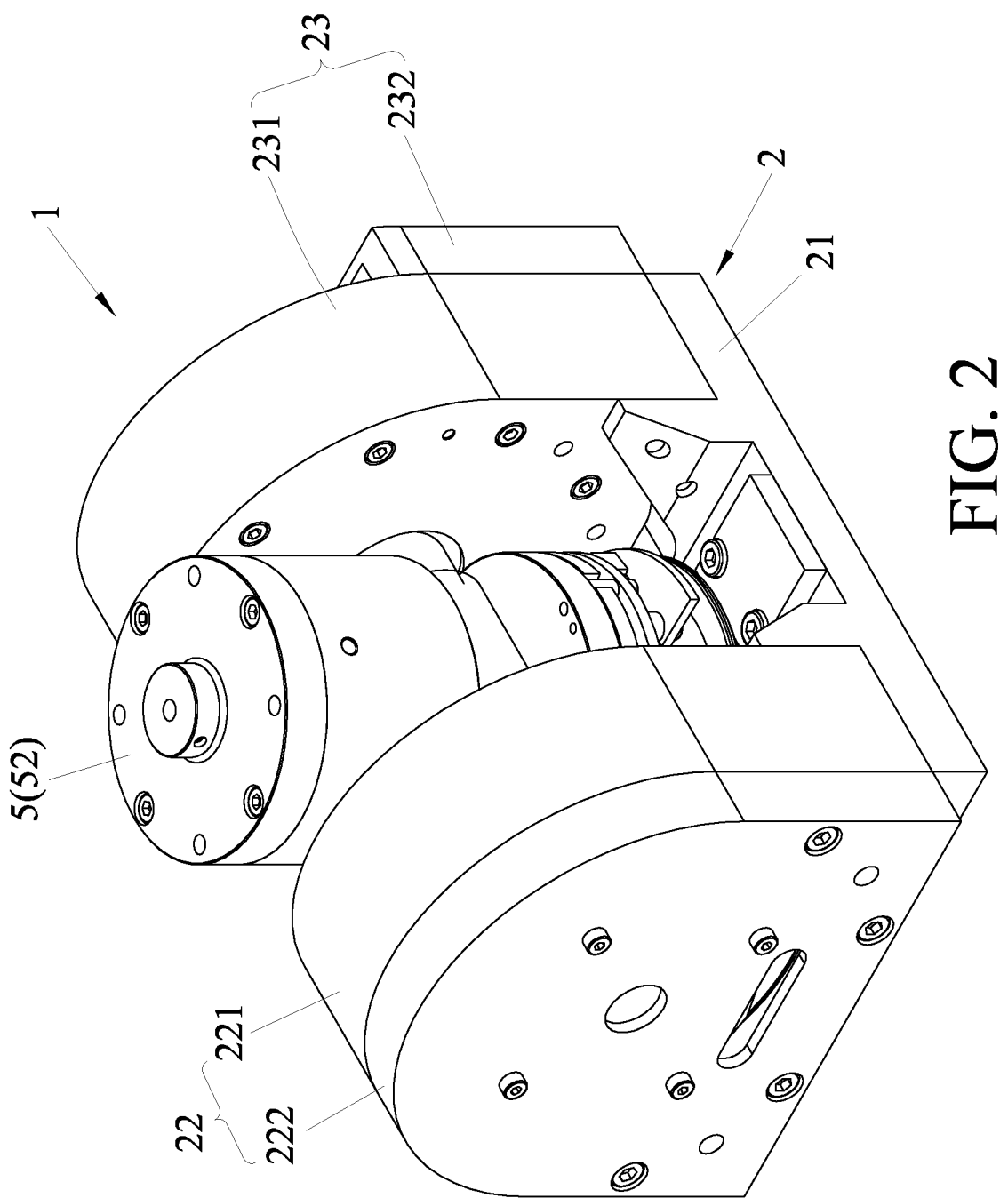
FIG. 2 is a perspective view of an embodiment of a wrist mechanism for a mechanical arm according to the disclosure.
Figure 3:
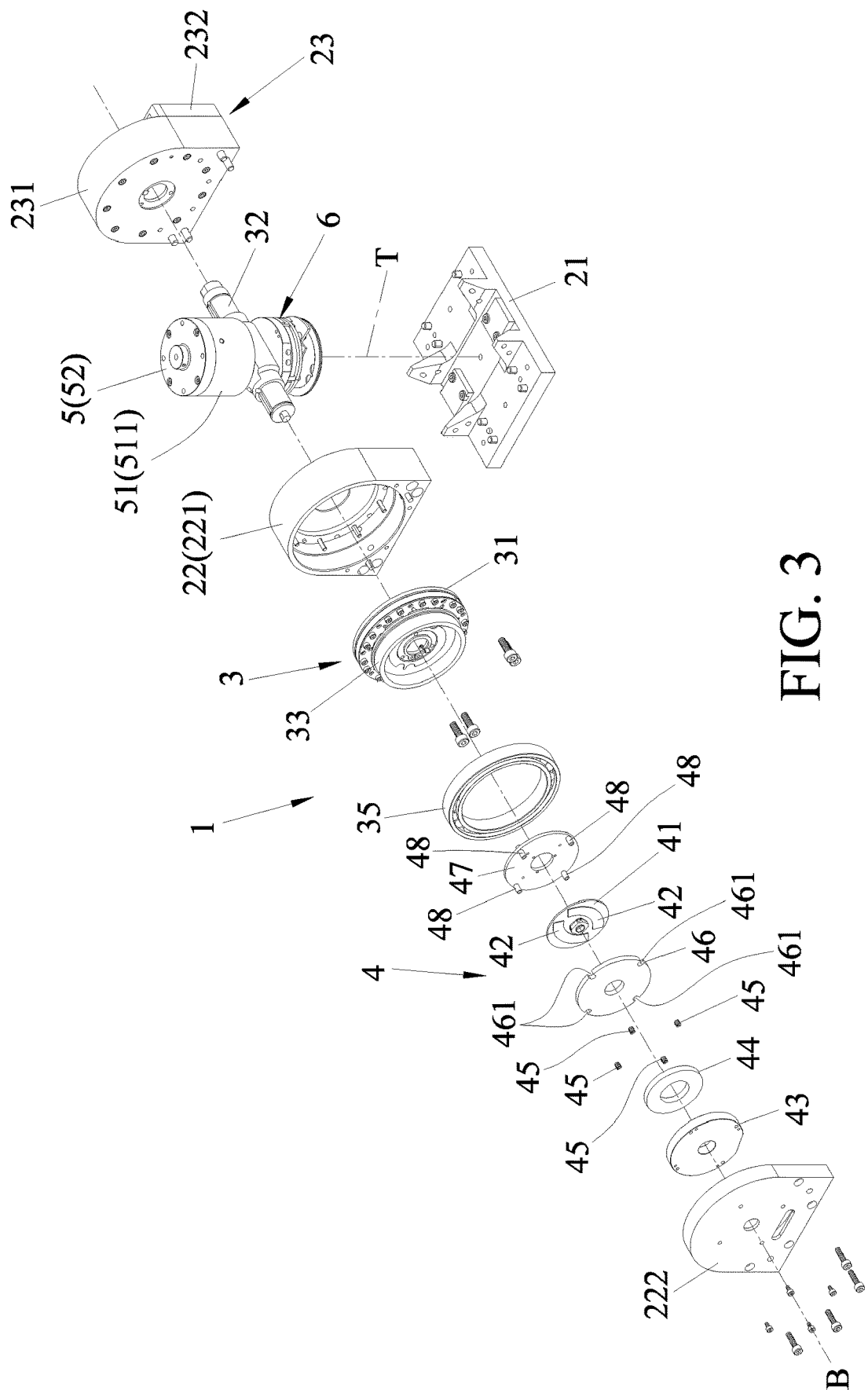
FIG. 3 is a partly exploded perspective view illustrating a first rotation unit and a first brake unit of the embodiment.

Referring to FIGS. 2 and 3, an embodiment of a wrist mechanism 1 according to the disclosure is adapted to be used in a mechanical arm (not shown). Specifically, the wrist mechanism 1 is adapted to be mounted to the mechanical arm, and is controlled by signals of a server (not shown). The wrist mechanism 1 includes a housing unit 2, a first rotation unit 3, a first brake unit 4, a second rotation unit 5, and a second brake unit 6.

The housing unit 2 includes a base seat 21, a first side seat 22 that is mounted to the base seat 21, and a second side seat 23 that is mounted to the base seat 21 and that is spaced apart from the first side seat 22. The first side seat 22 includes a first side housing portion 221 that is connected to the base seat 21, and a first cover plate 222 that covers one side of the first side housing portion 221. The second side seat 23 includes a second side housing portion 231 that is connected to the base seat 21, and a second cover plate 232 that covers one side of the second side housing portion 231.

Figure 4:
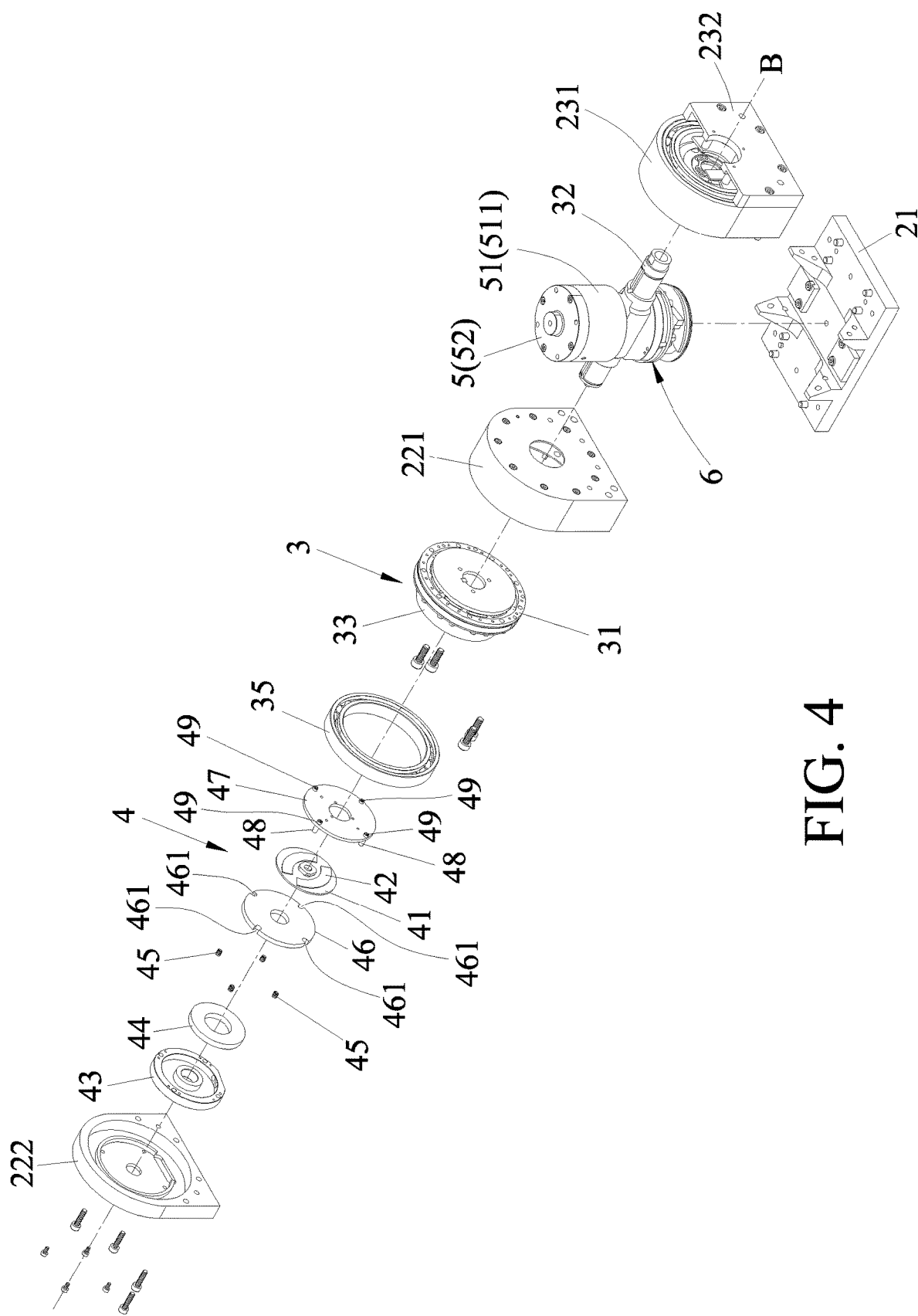
FIG. 4 is a view similar to FIG. 3.
Figure 5:
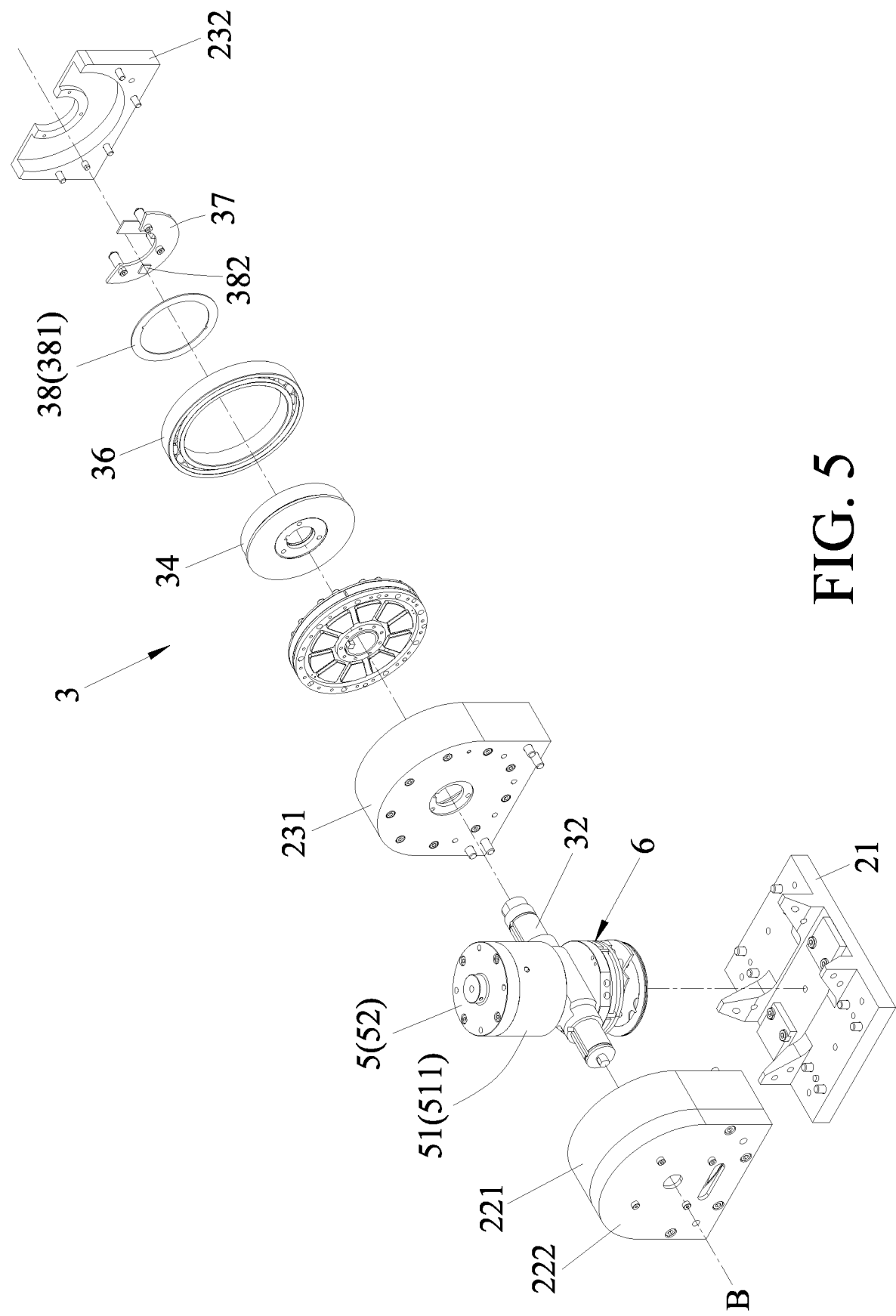
FIG. 5 is another partly exploded perspective view of the first rotation unit.

Referring to FIGS. 4 and 5, in cooperation with FIG. 3, the first rotation unit 3 includes a first motor 31 that is disposed in the housing unit 2, a first rotating shaft 32, two annular connection seats, two bearings, a first circuit board 37, and a first encoder 38. Specifically, the first motor 31 is mounted to the first and second side seats 22, 23, and is signally coupled to the server. The first rotating shaft 32 is connected to the first motor 31, and extends through the first and second side seats 22, 23 along a first axis (B). One of the annular connection seats is fixedly connected to an end of the first rotating shaft 32, and is located in the first side housing portion 221 of the first side seat 22. Another one of the annular connection seats is fixedly connected to another end of the first rotating shaft 32, and is located in the second side housing portion 231 of the second side seat 23. For clarity purposes, the one of the annular connection seats that is located in the first side housing portion 221 will hereinafter be referred to as the first annular connection seat 33, while the another one of the annular connection seats that is located in the second side housing portion 231 will hereinafter be referred to as the second annular connection seat 34. One of the bearings is disposed between and abuts against the first annular connection seat 33 and the first side housing portion 221. Another one of the bearings is disposed between and abuts against the second annular connection seat 34 and the second side housing portion 231. For clarity purposes, the one of the bearings that is disposed between the first annular connection seat 33 and the first side housing portion 221 will hereinafter be referred to as the first bearing 35, while the another one of the bearings that is disposed between the second annular connection seat 34 and the second side housing portion 231 will hereinafter be referred to as the second bearing 36. The first circuit board 37 is fixedly mounted to the second cover plate 232 of the second side seat 23. The first encoder 38 is located in the second side housing portion 231.

Figure 6:
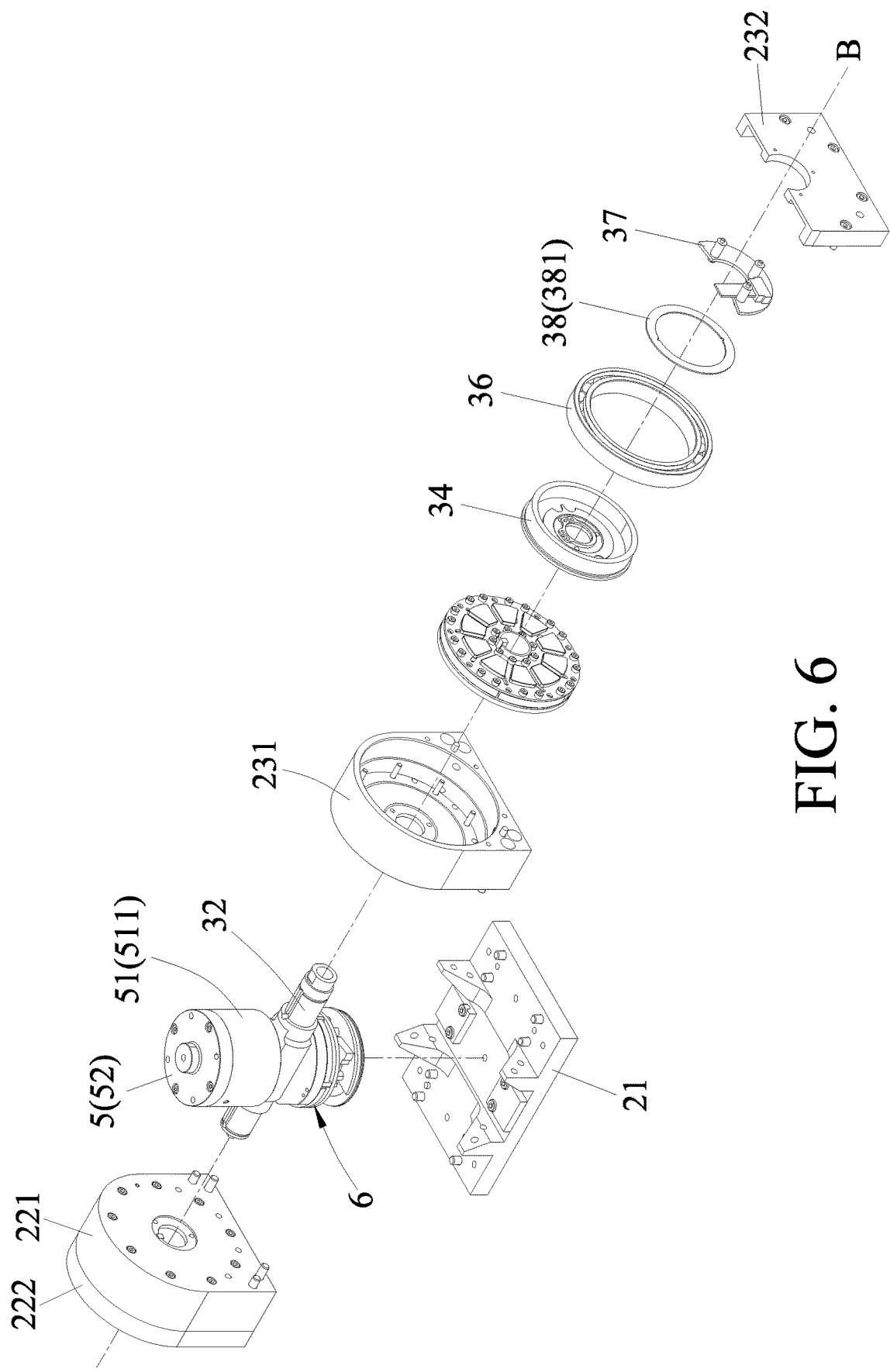
FIG. 6 is a view similar to FIG. 5.

Referring to FIG. 6, in cooperation with FIGS. 4 and 5, the first motor 31 is controlled by the signals of the server such that the first motor 31 is operable to drive the first rotating shaft 32 to rotate about the first axis (B). The first encoder 38 is connected to the first rotating shaft 32, and measures an angle of rotation of the first rotating shaft 32. Specifically, the first encoder 38 includes a first code disc 381 and a first readhead 382. The first code disc 381 is fixedly mounted to the second annular connection seat 34 such that the first code disc 381 co-rotates with the first rotating shaft 32 about the first axis (B). The first readhead 382 is electrically coupled to the first circuit board 37, detects rotation of the first code disc 381, and is disposed on the housing unit 2. Specifically, the first readhead 382 is mounted to one side of the first circuit board 37 that faces the first code disc 381.

It is noted that, in this embodiment, the first motor 31 is configured to be a disc-type motor. The first encoder 38 is configured to be a reflective optical encoder. The first code disc 381 has a plurality of reflective regions and non-reflective regions (not shown) that are alternately arranged. When the first code disc 381 co-rotates with the second annular connection seat 34 and the first rotating shaft 32, the first readhead 382 continuously emits light toward the first code disc 381. When the light hits any one of the reflective regions of the first code disc 381, the light is reflected and then received by the first readhead 382. When the light hits any one of the non-reflective regions of the first code disc 381, the light is not received by the first readhead 382. The first readhead 382 encodes intervals of a period of time in which the first readhead 382 receives the light and a period of time in which the first readhead 382 does not receive the light so as to calculate and measure the angle of the rotation of the first rotating shaft 32. The first encoder 38 cooperates with the server to control the first motor 31 via closed-loop control, thereby increasing rotation accuracy of the first rotating shaft 32 when the first motor 31 drives the first rotating shaft 32 to rotate.

Figure 9:
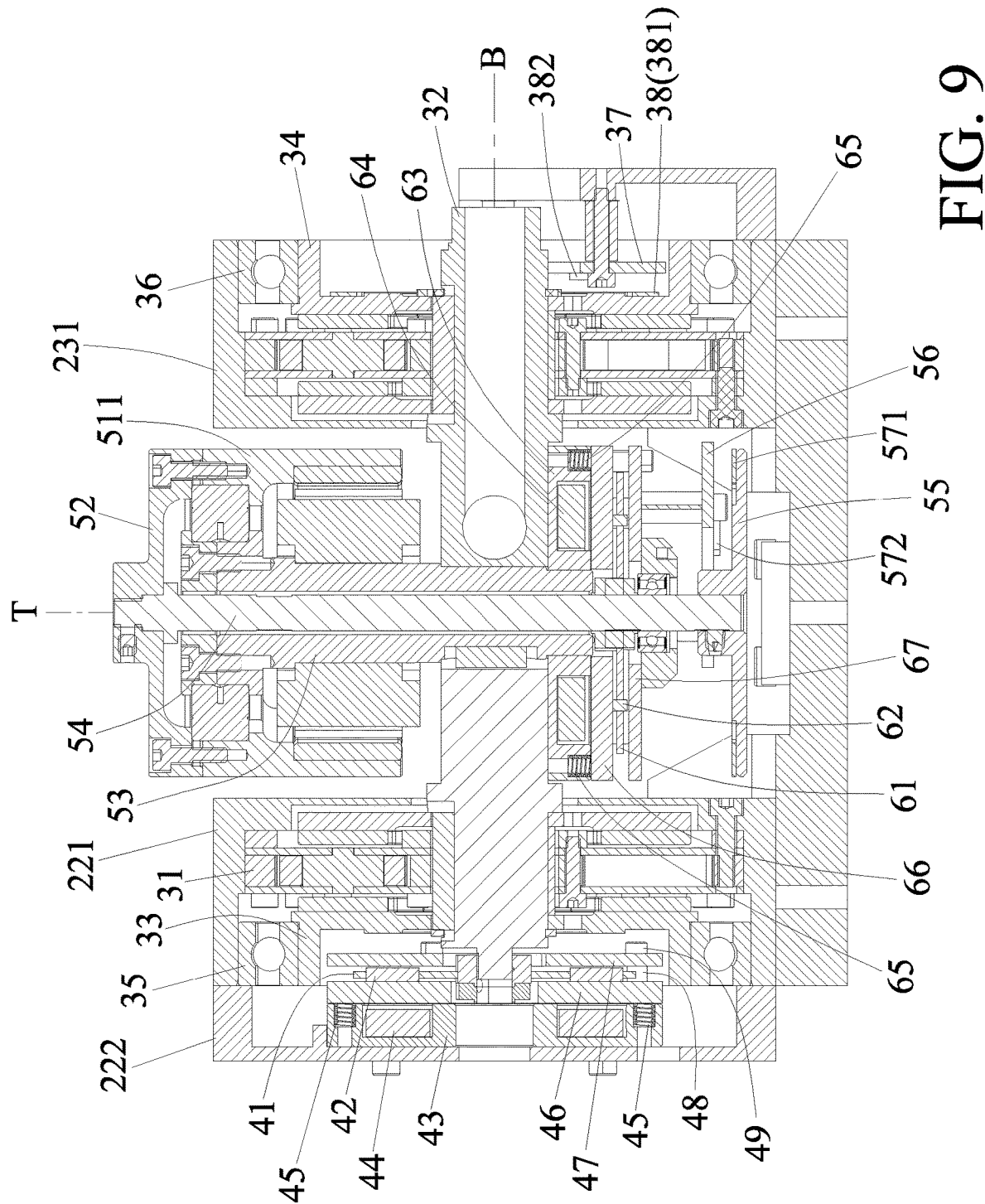
FIG. 9 is a sectional view of the embodiment.

Referring to FIG. 9, in cooperation with FIGS. 3 and 4, the first brake unit 4 is located in the first side seat 22, and includes a first brake mounting plate 41, two first brake pads 42, a first mounting seat 43, a first coil 44, four first resilient members 45, a first brake plate 46, a first securing plate 47, and four guiding rods 48. The first brake mounting plate 41 is fixedly connected to the first rotating shaft 32. The first brake pads 42 are mounted to the first brake mounting plate 41 such that the first brake pads 42 are connected to the first rotating shaft 32. The first mounting seat 43 is fixedly connected to the first cover plate 222 of the housing unit 2, and accommodates the first coil 44 and the first resilient members 45. The first brake plate 46 is operable to move relative to the first brake pads 42 along the first axis (B). The first securing plate 47 is spaced apart from the first mounting seat 43 along the first axis (B), and is fixedly connected to the first mounting seat 43. Each of the first guiding rods 48 is disposed between and abuts against the first mounting seat 43 and the first securing plate 47.

Figure 10:
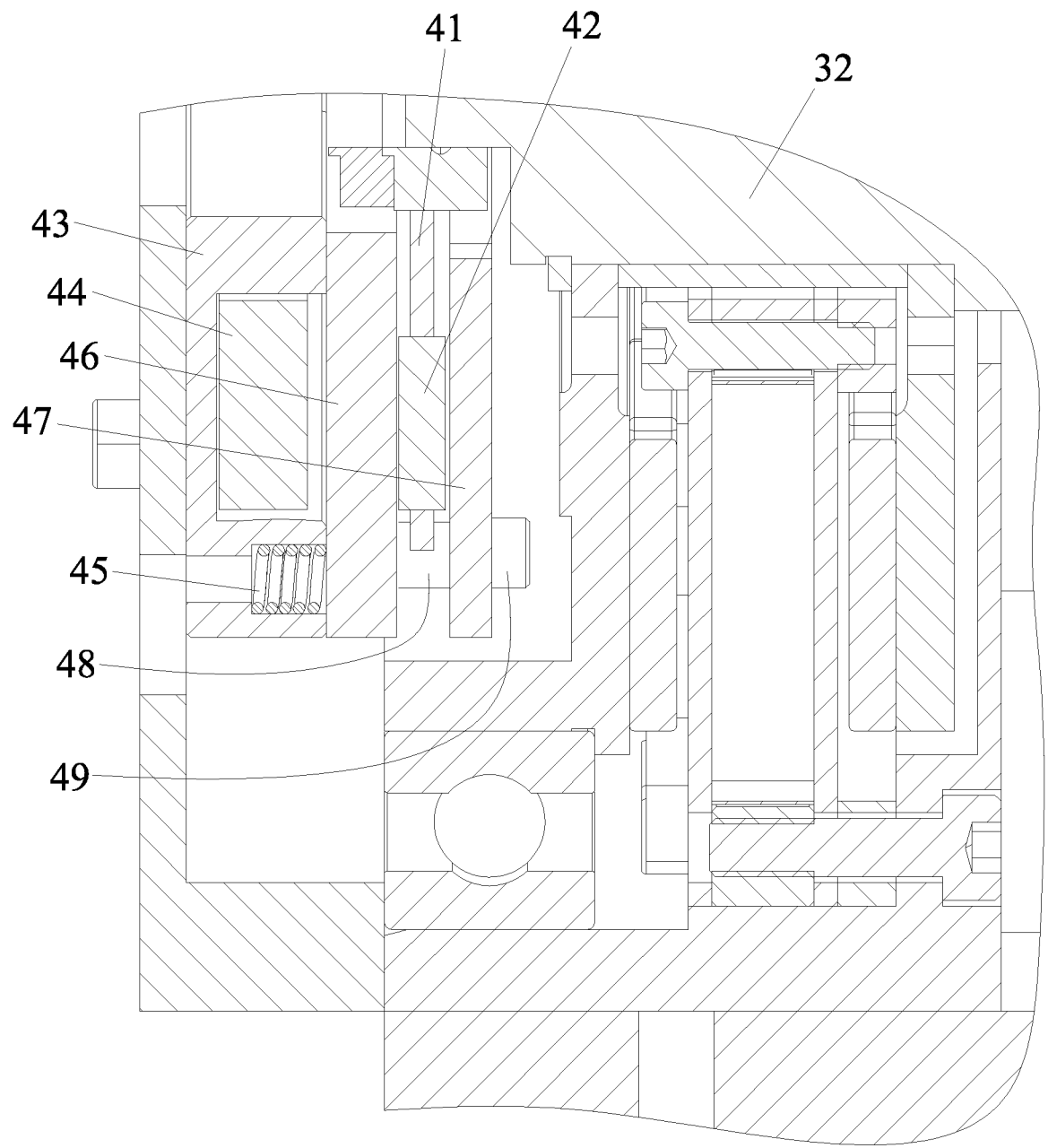
FIG. 10 is a fragmentary, enlarged sectional view of the first brake unit, illustrating a first brake plate of the first brake unit being spaced apart from a first brake pad of the first brake unit.

Because the first brake pads 42 are mounted to the first brake mounting plate 41, and the first brake mounting plate 41 is fixedly connected to the first rotating shaft 32, the first brake pads 42 are carried by the first brake mounting plate 41 to co-rotate with the first rotating shaft 32 when the first rotating shaft 32 rotates about the first axis (B). The first brake mounting plate 41 is located between the first securing plate 47 and the first brake plate 46, and the first brake pads 42 are located between the first securing plate 47 and the first brake plate 46. The first brake pads 42 are spaced apart from the first securing plate 47 (see FIG. 10).

Figure 11:
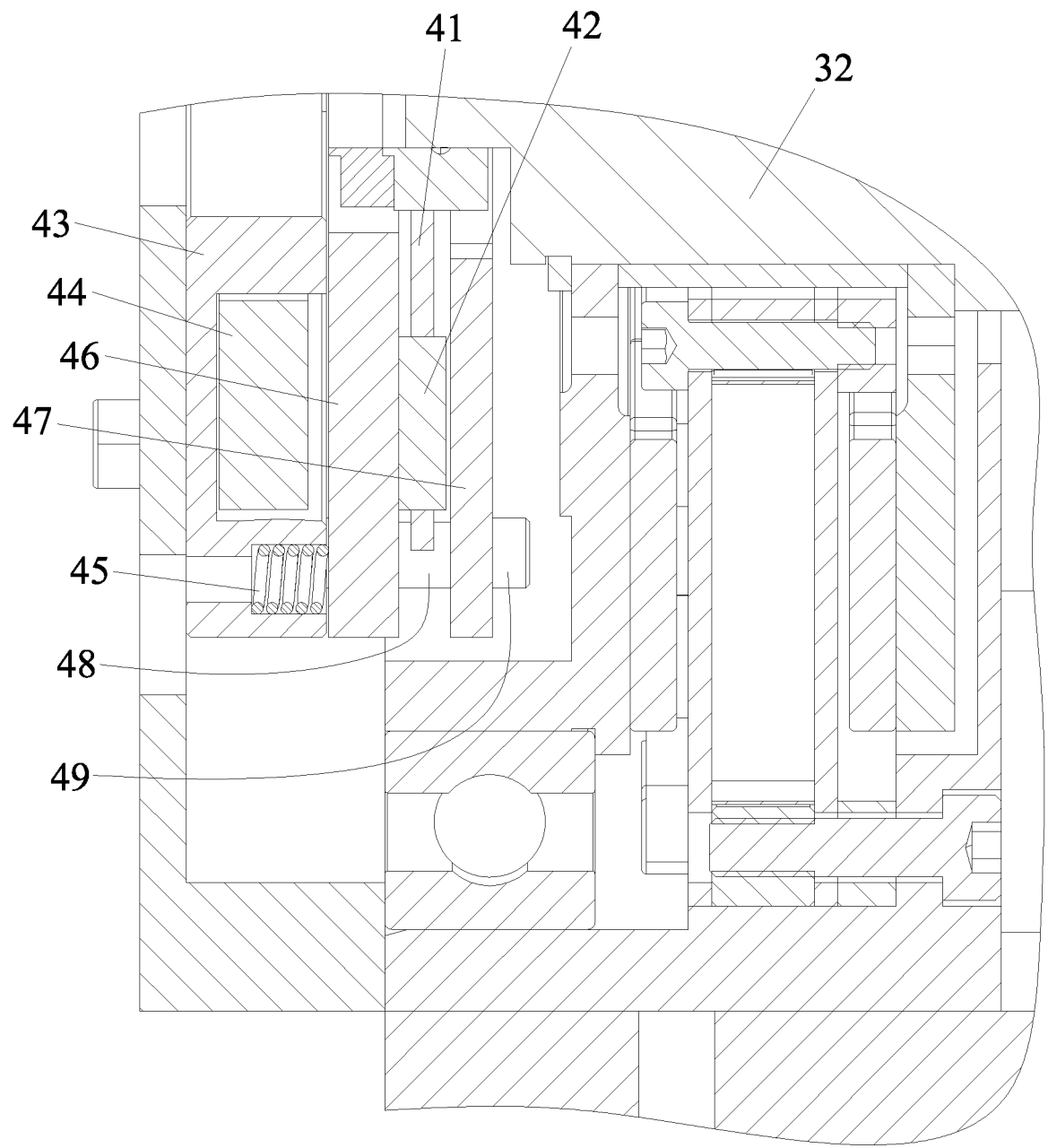
FIG. 11 is a view similar to FIG. 10, but illustrating the first brake plate abutting against the first brake pad.

Referring to FIG. 9 again, the first coil 44 is located at one side of the first brake plate 46 opposite to the first brake mounting plate 41 (i.e., the first coil 44 is located at one side of the first brake plate 46 opposite to the first brake pads 42), and is controlled by the server to be energized or de-energized. The first resilient members 45 resiliently push the first brake plate 46 toward the first brake pads 42. Referring to FIG. 10 again, when the first coil 44 is energized, the first coil 44 attracts the first brake plate 46 such that the first brake plate 46 is urged to move away from the first brake pads 42 and compresses the first resilient members 45. At this time, the first brake plate 46 is spaced apart from the first brake pads 42. Referring to FIG. 11, when the first coil 44 is de-energized, the first brake plate 46 is pushed by the first resilient members 45 to move toward the first brake pads 42 along the first axis (B) such that the first brake plate 46 abuts against the first brake pads 42.

Referring to FIGS. 3 and 4 again, the first securing plate 47 is fixedly connected to the first mounting seat 43 by four screws 49 that extend through the first securing plate 47, that respectively extend through the first guiding rods 48, and that are threadedly connected to the first mounting seat 43. The first brake plate 46 has four first grooves 461 that are spaced apart from each other and that surround the first axis (B). The first guiding rods 48 respectively extend through the first grooves 461. By virtue of the first guiding rods 48 respectively extending through the first grooves 461, the first guiding rods 48 serve as rails that guide movement of the first brake plate 46 so that the first brake plate 46 may be ensured to steadily move between the first mounting seat 43 and the first securing plate 47 along the first axis (B).

Figure 7:
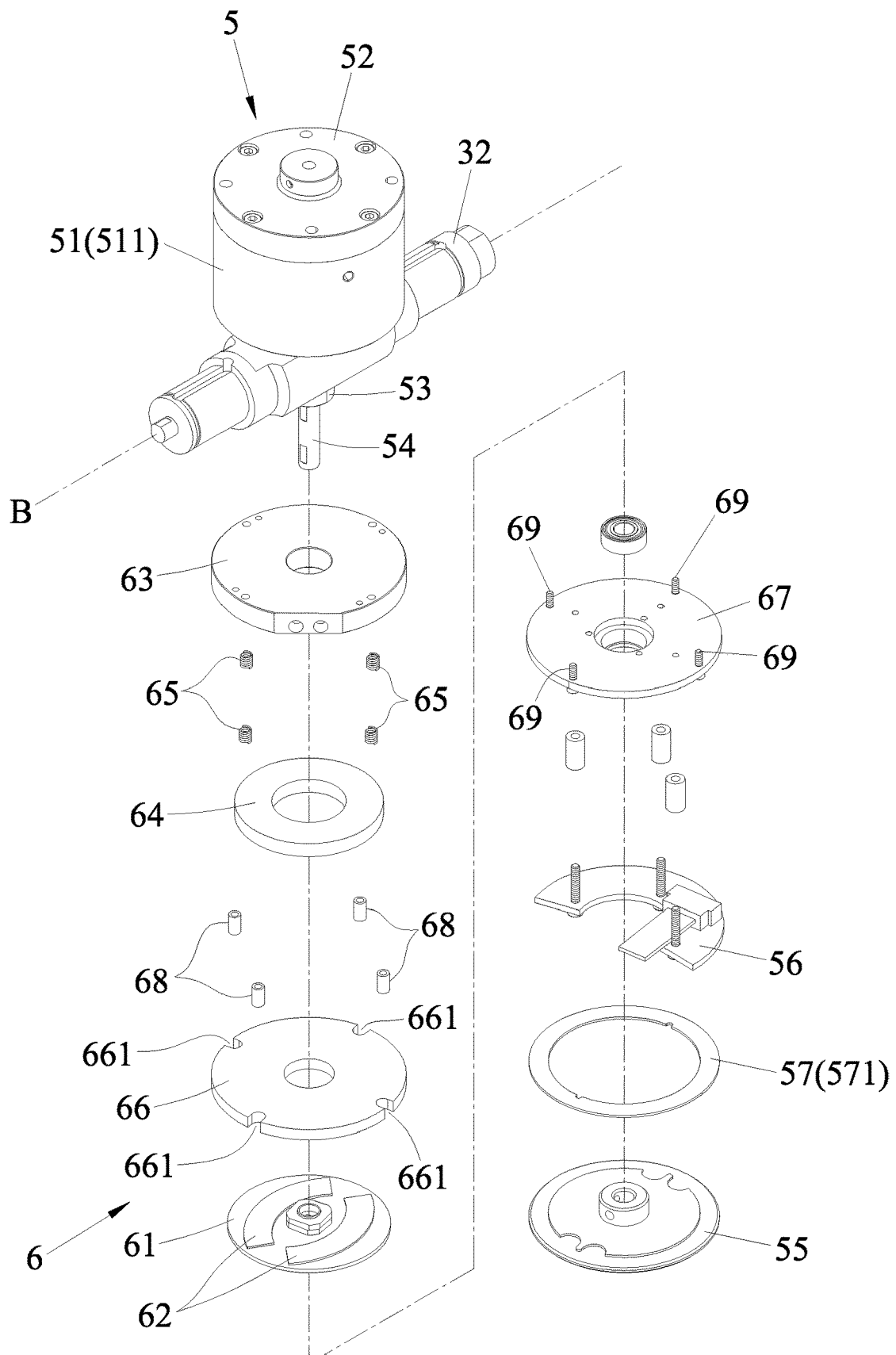
FIG. 7 is a partly exploded perspective view of a second rotation unit and a second brake unit of the embodiment.
Figure 8:
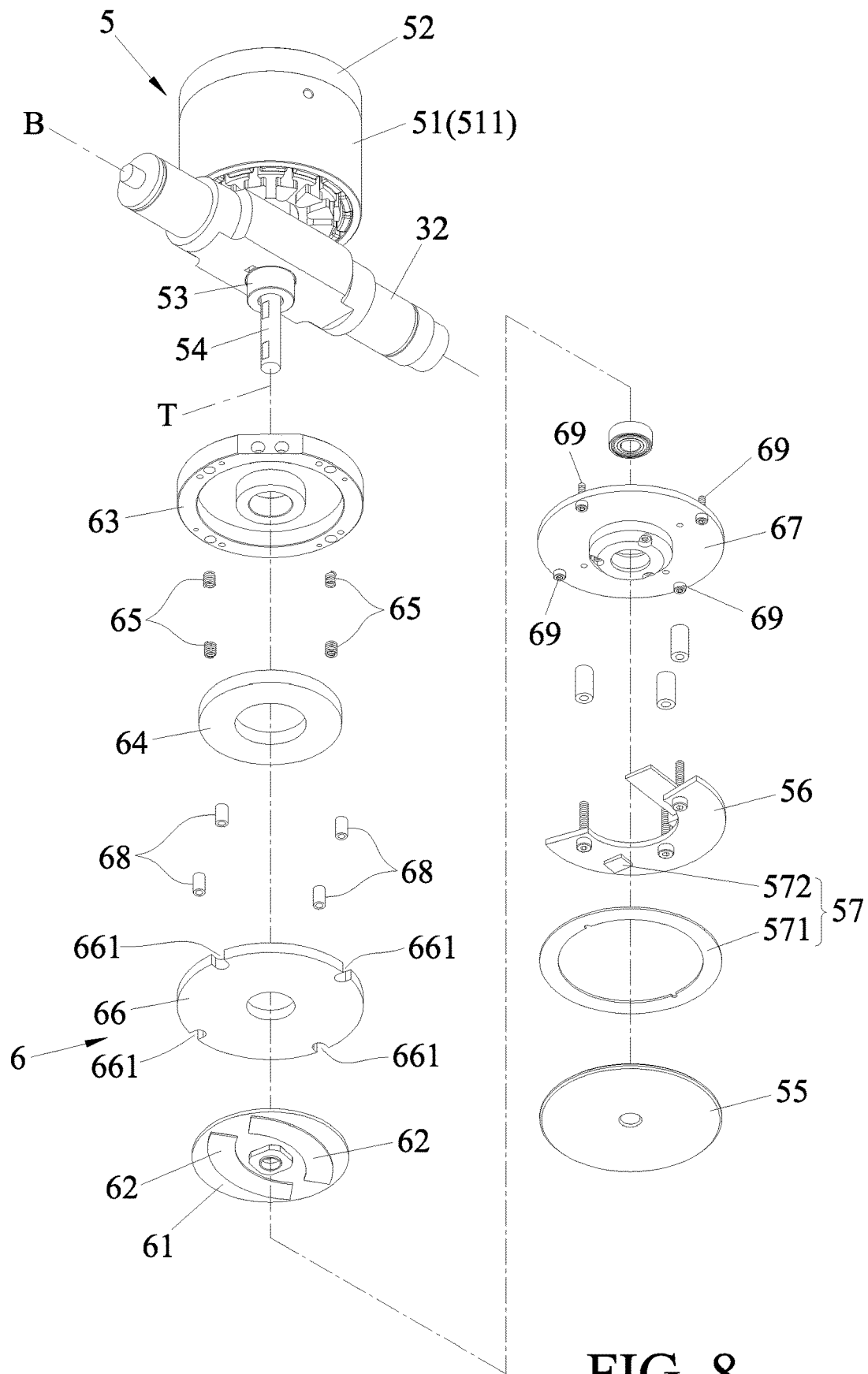
FIG. 8 is a view similar to FIG. 7.

Referring to FIGS. 7 and 8, in cooperation with FIG. 9, the second rotation unit 5 is disposed on the first rotating shaft 32, and is co-rotatable with the first rotating shaft 32 about the first axis (B). The second rotation unit 5 includes a second motor 51, a work platform 52, a hollow tube 53, a second rotating shaft 54, an end seat 55, a second circuit board 56, and a second encoder 57. The second motor 51 is signally coupled to the server. The work platform 52 is connected to the second motor 51. The hollow tube 53 is connected to the second motor 51, extends through the first rotating shaft 32 along a second axis (T) that is orthogonal to the first axis (B), and is fixedly connected to the first rotating shaft 32. The second rotating shaft 54 is connected to the work platform 52, extends through the hollow tube 53, and is rotatable relative to the hollow tube 53. Specifically, the work platform 52 is connected to one end of the second rotating shaft 54. The end seat 55 is connected to another end of the second rotating shaft 54 opposite to the work platform 52. The second encoder 57 measures an angle of rotation of the second rotating shaft 54.

The second motor 51 is configured to be an external rotor motor, and includes an outer rotor 511 that is controlled by the signals of the server to rotate about the second axis (T). The work platform 52 is connected to a top end of the outer rotor 511 such that the outer rotor 511 is operable to drive the work platform 52 to rotate about the second axis (T). The work platform 52 is adapted for a workpiece that is ready to be processed, or a processing tool, to be mounted thereto. By virtue of the work platform 52 being connected to the one end of the second rotating shaft 54, the second rotating shaft 54 co-rotates with the work platform 52 about the second axis (T). By virtue of the end seat 55 being connected to the another end of the second rotating shaft 54, the end seat 55 co-rotates with the second rotating shaft 54 about the second axis (T).

The second encoder 57 includes a second code disc 571 that is mounted to the end seat 55 (i.e., the second code disc 571 is mounted to the another end of the second rotating shaft 54 opposite to the work platform) and that co-rotates with the second rotating shaft 54, and a second readhead 572 that is electrically coupled to the second circuit board 56, and that detects rotation of the second code disc 571. The second readhead 572 is disposed on one side of the second circuit board 56 that faces the second code disc 571.

It is noted that, the second encoder 57 is configured to be a reflective optical encoder like the first encoder 38. Thus, detailed descriptions of a structure and a working principle of the second encoder 57 are omitted. When the second code disc 571 co-rotates with the end seat 55 and the second rotating shaft 54, the second readhead 572 encodes intervals of a period of time in which the second readhead 572 receives light reflected by the second code disc 571 and a period of time in which the second readhead 572 does not receive the light reflected by the second code disc 571 so as to calculate and measure the angle of the rotation of the second rotating shaft 54. The second encoder 57 cooperates with the server to control the second motor 51 via closed-loop control, thereby increasing rotation accuracy of the second rotating shaft 54 and rotation accuracy of the work platform 52 when the second motor 51 drives the work platform 52 to rotate.

The second brake unit 6 is located at one end of the hollow tube 53 opposite to the second motor 51, and includes a second brake mounting plate 61, two second brake pads 62, a second mounting seat 63, a second coil 64, four second resilient members 65, a second brake plate 66, a second securing plate 67, and four second guiding rods 68. The second brake mounting plate 61 is connected to the second rotating shaft 54. The second brake pads 62 are mounted to the second brake mounting plate 61 such that the second brake pads 62 are connected to the second rotating shaft 54. The second mounting seat 63 is fixedly connected to the one end of the hollow tube 53 opposite to the second motor 51, and accommodates the second coil 64 such that the second coil 64 is connected to the hollow tube 53. The second resilient members 65 are accommodated in the second mounting seat 63. The second brake plate 66 is operable to move relative to the second brake pads 62 along the second axis (T). The second securing plate 67 is spaced apart from the second mounting seat 63 along the second axis (T), and is fixedly connected to the second mounting seat 63. Each of the second guiding rods 68 is disposed between and abuts against the second mounting seat 63 and the second securing plate 67.

Figure 12:
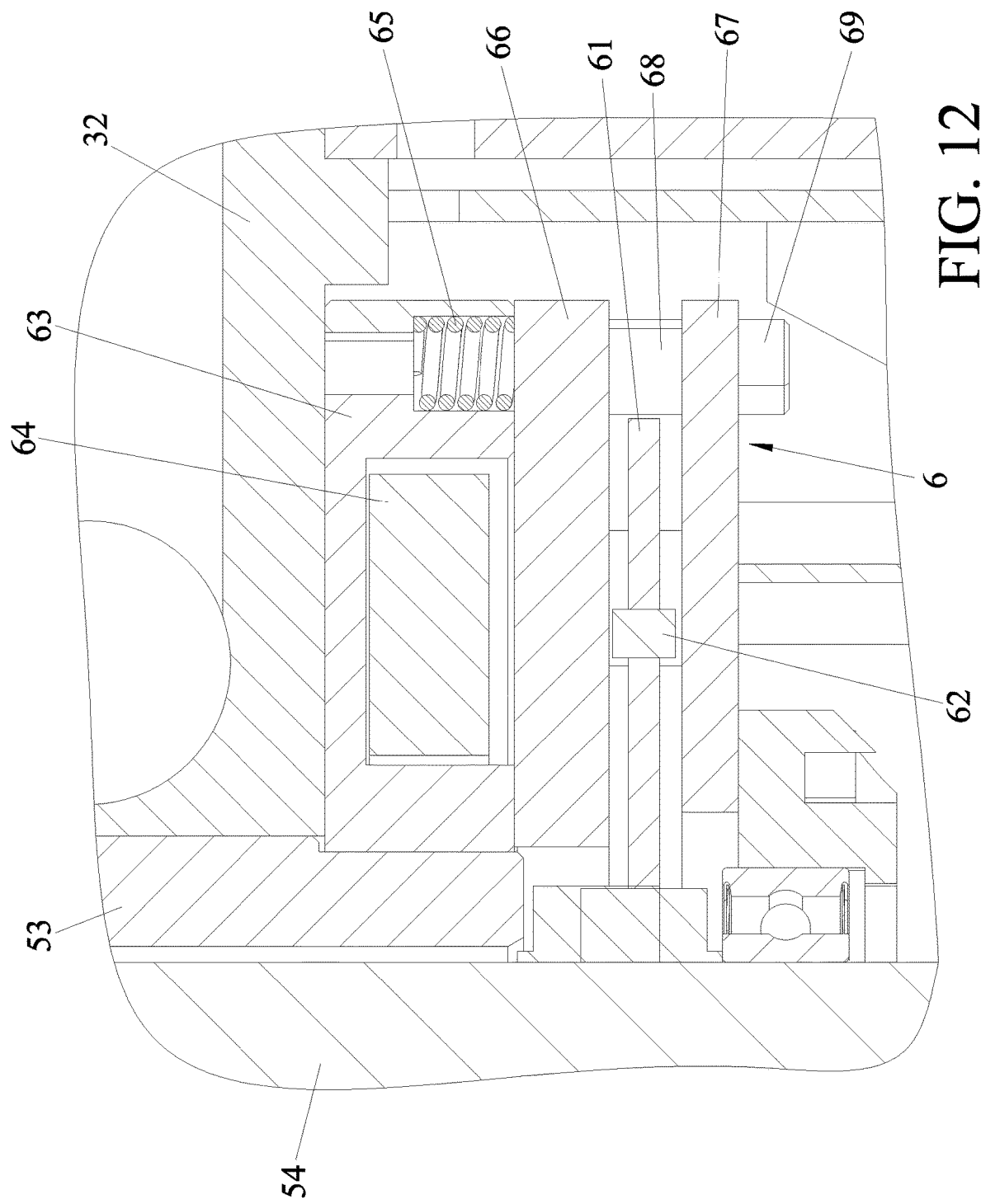
FIG. 12 is a fragmentary, enlarged sectional view of the second brake unit, illustrating a second brake plate of the second brake unit being spaced apart from a second brake pad of the second brake unit.

Because the second brake pads 62 are mounted to the second brake mounting plate 61, and the second brake mounting plate 61 is connected to the second rotating shaft 54, the second brake pads 62 are carried by the second brake mounting plate 61 to co-rotate with the second rotating shaft 54 when the second rotating shaft 54 rotates about the second axis (T). The second brake mounting plate 61 is located between the second securing plate 67 and the second brake plate 66, and the second brake pads 62 are located between the second securing plate 67 and the second brake plate 66. The second brake pads 62 are spaced apart from the second securing plate 67 (see FIG. 12).

Figure 13:
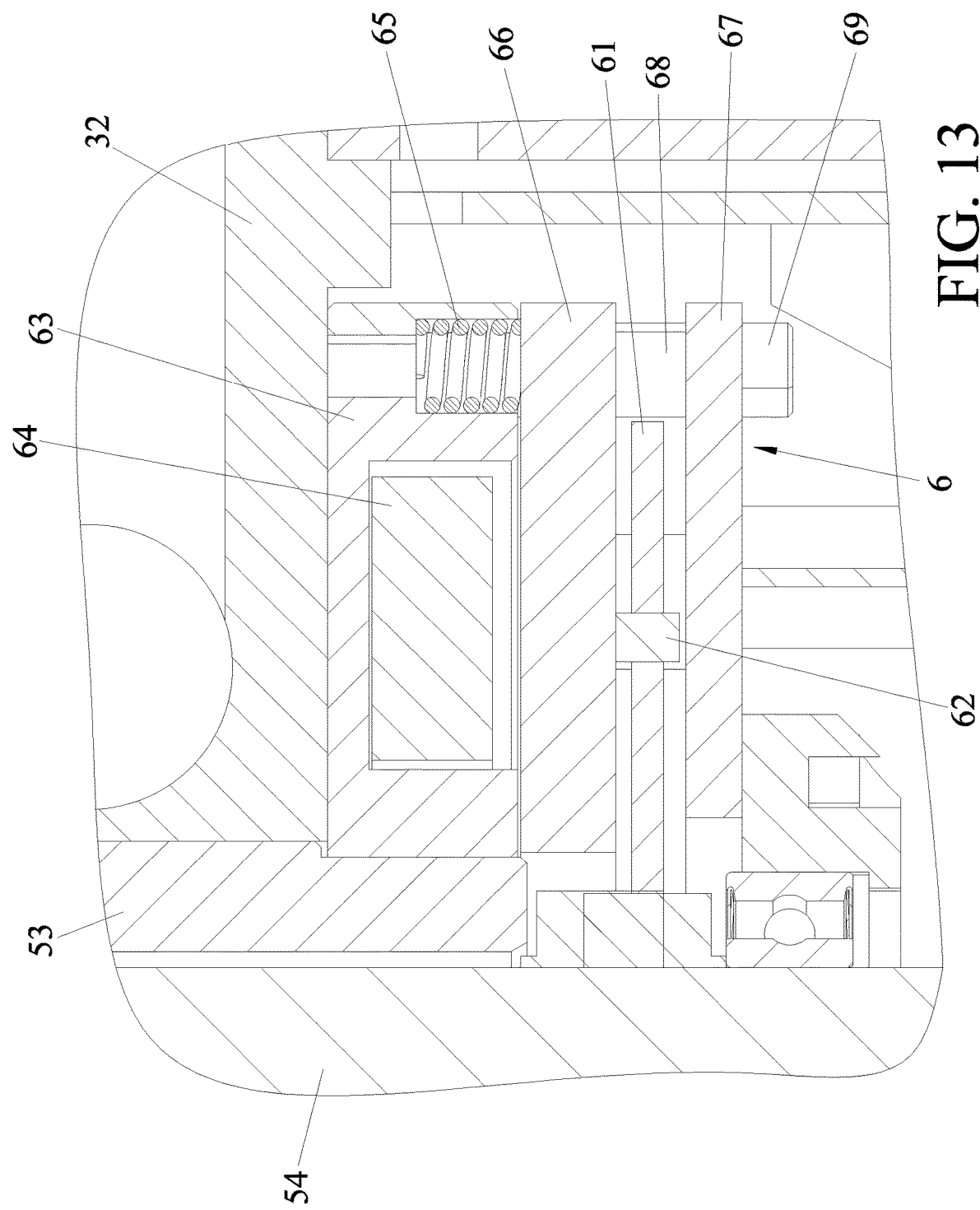
FIG. 13 is a view similar to FIG. 12, but illustrating the second brake plate abutting against the second brake pad.

Referring to FIG. 9 again, the second coil 64 and the second resilient members 65 are located at one side of the second brake plate 66 opposite to the second brake pads 62. The second coil 64 is controlled by the signals of the server to be energized or de-energized. The second resilient members 65 resiliently push the second brake plate 66 toward the second brake pads 62. Referring to FIG. 12 again, when the second coil 64 is energized, the second coil 64 attracts the second brake plate 66 such that the second brake plate 66 is urged to move away from the second brake pads 62 and compresses the second resilient members 65. At this time, the second brake plate 66 is spaced apart from the second brake pads 62. Referring to FIG. 13, when the second coil 64 is de-energized, the second brake plate 66 is pushed by the second resilient members 65 to move toward the second brake pads 62 along the second axis (T) such that the second brake plate 66 abuts against the second brake pads 62.

Referring to FIGS. 8 and 9 again, the second readhead 572 is disposed on the second securing plate 67. Specifically, the second readhead 572 is disposed on the one side of the second circuit board 56 that faces the second code disc 571, and the second circuit board 56 is fixedly connected to the second securing plate 67.

Referring to FIGS. 7, 8, and 12 again, the second securing plate 67 is fixedly connected to the second mounting seat 63 by four screws 69 that extend through the second securing plate 67, that respectively extend through the second guiding rods 68, and that are threadedly connected to the second mounting seat 63. The second brake plate 66 has four second grooves 661 that are spaced apart from each other and that surround the second axis (T). The second guiding rods 68 respectively extend through the second grooves 661. By virtue of the second guiding rods 68 respectively extending through the second grooves 661, the second guiding rods 48 serve as rails that guide movement of the second brake plate 66 so that the second brake plate 66 may be ensured to steadily move between the second mounting seat 63 and the second securing plate 67 along the second axis (T).

Referring to FIGS. 9 to 11 again, when the wrist mechanism 1 for the mechanical arm is in operation, the first motor 31 is controlled by the server to drive the first rotating shaft 32 to rotate about the first axis (B). The first encoder 38 measures the angle of the rotation of the first rotating shaft 32, and cooperates with the server to control the first motor 31 via the closed-loop control, thereby increasing the rotation accuracy of the first rotating shaft 32 when the first motor 31 drives the first rotating shaft 32 to rotate. When the first rotating shaft 32 rotates, the second rotation unit 5 and the first brake mounting plate 41 are urged by the first rotating shaft 32 to co-rotate with the first rotating shaft 32 about the first axis (B). When the first motor 31 is controlled by the server to drive the first rotating shaft 32 to rotate, the first coil 44 is synchronously controlled by the server to be energized such that the first brake plate 46 is attracted by the first coil 44 and compresses the first resilient members 45. At this time, because the first brake plate 46 is urged to move away from the first brake pads 42 and is not in contact with the first brake pads 42, the first brake mounting plate 41 is ensured to co-rotate with the first rotating shaft 32 about the first axis (B). When the first rotating shaft 32 is rotated to a desired position for a user of the mechanical arm, the first coil 44 is immediately controlled by the server to be de-energized such that the first brake plate 46 is no longer attracted by the first coil 44, and is pushed by the first resilient members 45 to move toward and then to abut against the first brake pads 42. When the first brake plate 46 is urged to move along the first axis (B) to abut against the first brake pads 42, rotation of the first brake mounting plate 41 about the first axis (B) is stopped, thereby stopping the rotation of the first rotating shaft 32 about the first axis (B). Therefore, the first brake unit 4 may further increase the rotation accuracy and reliability of the first rotating shaft 32.

Referring to FIGS. 9, 12, and 13 again, when the second motor 51 is controlled by the server to drive the work platform 52 to rotate about the second axis (T), the second rotating shaft 54 co-rotates with the work platform 52, and the second brake mounting plate 61 co-rotates with the second rotating shaft 54. The second encoder 57 measures the angle of the rotation of the second rotating shaft 54, and cooperates with the server to control the second motor 51 via the closed-loop control, thereby increasing the rotation accuracy of the second rotating shaft 54. When the second motor 51 is controlled by the server to drive the work platform 52 to rotate, the second coil 64 is synchronously controlled by the server to be energized such that the second brake plate 66 is attracted by the second coil 64 and compresses the second resilient members 65. At this time, because the second brake plate 66 is urged to move away from the second brake pads 62 and is not in contact with the second brake pads 62, the second brake mounting plate 61 is ensured to co-rotate with the second rotating shaft 54. When the second rotating shaft 54 is rotated to a desired position for the user of the mechanical arm, the second coil 64 is immediately controlled by the server to be de-energized such that the second brake plate 66 is no longer attracted by the second coil 64, and is pushed by the second resilient members 65 to move toward and then to abut against the second brake pads 62. When the second brake plate 66 is urged to move along the second axis (T) to abut against the second brake pads 62, rotation of the second brake mounting plate 61 about the second axis (T) is stopped, thereby stopping the rotation of the second rotating shaft 54 about the second axis (T) and rotation of the work platform 52 about the second axis (T). Therefore, the second brake unit 6 may further increase the rotation accuracy and reliability of each of the second rotating shaft 54 and the work platform 52.

In summary, by virtue of the first encoder 38 measuring the angle of the rotation of the first rotating shaft 32 and cooperating with the server to control the first motor 31 via the closed-loop control, and by virtue of the second encoder 57 measuring the angle of the rotation of the second rotating shaft 54 and cooperating with the server to control the second motor 51 via the closed-loop control, the rotation accuracy of each of the first rotating shaft 32, the second rotating shaft 54, and the work platform 52 is increased. In addition, by virtue of the first brake unit 4 being capable of immediately stopping the rotation of the first rotating shaft 32 when the first rotating shaft 32 is rotated to a desired position for the user of the mechanical arm, and by virtue of the second brake unit 6 being capable of immediately stopping the rotation of the second rotating shaft 54 when the second rotating shaft 54 is rotated to a desired position for the user of the mechanical arm, the rotation accuracy and the reliability of each of the first rotating shaft 32 and the second rotating shaft 54 are further increased. Moreover, by virtue of the first and second encoders 38, 57 respectively controlling the first and second motors 31, 51, and by virtue of the first brake unit 4 and the second brake unit 6 being arranged closely, structure of the wrist mechanism 1 is relatively compact. That is to say, since the wrist mechanism 1 does not have belt pulleys, belts, and reduction devices that the abovementioned conventional wrist unit has, size of the wrist mechanism 1 is relatively small. Thus, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A wrist mechanism for a mechanical arm, the wrist mechanism comprising:
    a housing unit;
    a first rotation unit including a first motor that is disposed in the housing unit, a first rotating shaft that is connected to the first motor, and a first encoder, the first motor being operable to drive the first rotating shaft to rotate about a first axis, the first encoder measuring an angle of rotation of the first rotating shaft, and controlling the first motor via closed-loop control;
    a second rotation unit disposed on the first rotating shaft and co-rotatable with the first rotating shaft about the first axis, the second rotation unit including a second motor and a work platform that is connected to the second motor, the second motor being operable to drive the work platform to rotate about a second axis that is orthogonal to the first axis;
    a first brake unit including a first brake pad that is connected to the first rotating shaft, and a first brake plate that is operable to move relative to the first brake pad along the first axis, when the first brake plate is urged to move along the first axis to abut against the first brake pad, the rotation of the first rotating shaft being stopped; and
    a second brake unit;
    wherein the second rotation unit further includes a hollow tube that is connected to the second motor, that extends through the first rotating shaft along the second axis, and that is fixedly connected to the first rotating shaft, a second rotating shaft that is connected to the work platform, that extends through the hollow tube, and that is rotatable relative to the hollow tube, and a second encoder that measures an angle of rotation of the second rotating shaft, and that controls the second motor via closed-loop control, the second brake unit being located at one end of the hollow tube opposite to the second motor, and including a second brake pad that is connected to the second rotating shaft, and a second brake plate that is operable to move relative to the second brake pad along the second axis, when the second brake plate is urged to move along the second axis to abut against the second brake pad, the rotation of the second rotating shaft being stopped.

2. The wrist mechanism as claimed in claim 1, wherein the first brake unit further includes a first coil that is located at one side of the first brake plate opposite to the first brake pad, and a plurality of first resilient members that resiliently push the first brake plate toward the first brake pad, when the first coil is energized, the first coil attracting the first brake plate such that the first brake plate is urged to move away from the first brake pad and compresses the first resilient members, when the first coil is de-energized, the first brake plate being pushed by the first resilient members to move toward the first brake pad along the first axis such that the first brake plate abuts against the first brake pad.

3. The wrist mechanism as claimed in claim 1, wherein the first encoder includes a first code disc that co-rotates with the first rotating shaft, and a first readhead that is disposed on the housing unit and that detects rotation of the first code disc.

4. The wrist mechanism as claimed in claim 1, wherein the second brake unit further includes a second coil that is connected to the hollow tube, and a plurality of second resilient members that resiliently push the second brake plate toward the second brake pad, the second coil and the second resilient members being located at one side of the second brake plate opposite to the second brake pad, when the second coil is energized, the second coil attracting the second brake plate such that the second brake plate is urged to move away from the second brake pad and compresses the second resilient members, when the second coil is de-energized, the second brake plate being pushed by the second resilient members to move toward the second brake pad along the second axis such that the second brake plate abuts against the second brake pad.

5. The wrist mechanism as claimed in claim 4, wherein the second brake unit further includes a second mounting seat that is fixedly connected to the hollow tube, a second securing plate that is spaced apart from the second mounting seat along the second axis and that is fixedly connected to the second mounting seat, and a plurality of second guiding rods each of which is disposed between and abuts against the second mounting seat and the second securing plate, the second mounting seat accommodating the second coil and the second resilient members, the second brake pad being located between the second securing plate and the second brake plate, and being spaced apart from the second securing plate, the second brake plate having a plurality of second grooves, the second guiding rods respectively extending through the second grooves.

6. The wrist mechanism as claimed in claim 5, wherein the second encoder includes a second code disc that is mounted to one end of the second rotating shaft opposite to the work platform, and that co-rotates with the second rotating shaft, and a second readhead that is disposed on the second securing plate and that detects rotation of the second code disc.

7. A wrist mechanism for a mechanical arm, the wrist mechanism comprising:
    a housing unit;
    a first rotation unit including a first motor that is disposed in the housing unit, a first rotating shaft that is connected to the first motor, and a first encoder, the first motor being operable to drive the first rotating shaft to rotate about a first axis, the first encoder measuring an angle of rotation of the first rotating shaft, and controlling the first motor via closed-loop control;
    a second rotation unit disposed on the first rotating shaft and co-rotatable with the first rotating shaft about the first axis, the second rotation unit including a second motor and a work platform that is connected to the second motor, the second motor being operable to drive the work platform to rotate about a second axis that is orthogonal to the first axis; and a first brake unit including a first brake pad that is connected to the first rotating shaft, and a first brake plate that is operable to move relative to the first brake pad along the first axis, when the first brake plate is urged to move along the first axis to abut against the first brake pad, the rotation of the first rotating shaft being stopped;

wherein the first brake unit further includes a first coil that is located at one side of the first brake plate opposite to the first brake pad, and a plurality of first resilient members that resiliently push the first brake plate toward the first brake pad, when the first coil is energized, the first coil attracting the first brake plate such that the first brake plate is urged to move away from the first brake pad and compresses the first resilient members, when the first coil is de-energized, the first brake plate being pushed by the first resilient members to move toward the first brake pad along the first axis such that the first brake plate abuts against the first brake pad; and wherein the first brake unit further includes a first mounting seat that is fixedly connected to the housing unit, a first securing plate that is spaced apart from the first mounting seat along the first axis and that is fixedly connected to the first mounting seat, and a plurality of first guiding rods each of which is disposed between and abuts against the first mounting seat and the first securing plate, the first mounting seat accommodating the first coil and the first resilient members, the first brake pad being located between the first securing plate and the first brake plate, and being spaced apart from the first securing plate, the first brake plate having a plurality of first grooves, the first guiding rods respectively extending through the first grooves.

8. The wrist mechanism as claimed in claim 7, wherein the first encoder includes a first code disc that co-rotates with the first rotating shaft, and a first readhead that is disposed on the housing unit and that detects rotation of the first code disc.

9. The wrist mechanism as claimed in claim 7, wherein the housing unit includes a base seat, a first side seat that is mounted to the base seat, and a second side seat that is mounted to the base seat and that is spaced apart from the first side seat, the first motor being disposed on the first side seat, the first rotating shaft extending through the first side seat and the second side seat along the first axis, the first encoder being connected to the first rotating shaft and being located in the second side seat.

10. The wrist mechanism as claimed in claim 7, further comprising a second brake unit, the second rotation unit further including a hollow tube that is connected to the second motor, that extends through the first rotating shaft along the second axis, and that is fixedly connected to the first rotating shaft, a second rotating shaft that is connected to the work platform, that extends through the hollow tube, and that is rotatable relative to the hollow tube, and a second encoder that measures an angle of rotation of the second rotating shaft, and that controls the second motor via closed-loop control, the second brake unit being located at one end of the hollow tube opposite to the second motor, and including a second brake pad that is connected to the second rotating shaft, and a second brake plate that is operable to move relative to the second brake pad along the second axis, when the second brake plate is urged to move along the second axis to abut against the second brake pad, the rotation of the second rotating shaft being stopped.

11. The wrist mechanism as claimed in claim 10, wherein the second brake unit further includes a second coil that is connected to the hollow tube, and a plurality of second resilient members that resiliently push the second brake plate toward the second brake pad, the second coil and the second resilient members being located at one side of the second brake plate opposite to the second brake pad, when the second coil is energized, the second coil attracting the second brake plate such that the second brake plate is urged to move away from the second brake pad and compresses the second resilient members, when the second coil is de-energized, the second brake plate being pushed by the second resilient members to move toward the second brake pad along the second axis such that the second brake plate abuts against the second brake pad.

12. The wrist mechanism as claimed in claim 11, wherein the second brake unit further includes a second mounting seat that is fixedly connected to the hollow tube, a second securing plate that is spaced apart from the second mounting seat along the second axis and that is fixedly connected to the second mounting seat, and a plurality of second guiding rods each of which is disposed between and abuts against the second mounting seat and the second securing plate, the second mounting seat accommodating the second coil and the second resilient members, the second brake pad being located between the second securing plate and the second brake plate, and being spaced apart from the second securing plate, the second brake plate having a plurality of second grooves, the second guiding rods respectively extending through the second grooves.

13. The wrist mechanism as claimed in claim 12, wherein the second encoder includes a second code disc that is mounted to one end of the second rotating shaft opposite to the work platform, and that co-rotates with the second rotating shaft, and a second readhead that is disposed on the second securing plate and that detects rotation of the second code disc.

14. A wrist mechanism for a mechanical arm, the wrist mechanism comprising:

a housing unit;

a first rotation unit including a first motor that is disposed in the housing unit, a first rotating shaft that is connected to the first motor, and a first encoder, the first motor being operable to drive the first rotating shaft to rotate about a first axis, the first encoder measuring an angle of rotation of the first rotating shaft, and controlling the first motor via closed-loop control;

a second rotation unit disposed on the first rotating shaft and co-rotatable with the first rotating shaft about the first axis, the second rotation unit including a second motor and a work platform that is connected to the second motor, the second motor being operable to drive the work platform to rotate about a second axis that is orthogonal to the first axis; and a first brake unit including a first brake pad that is connected to the first rotating shaft, and a first brake plate that is operable to move relative to the first brake pad along the first axis, when the first brake plate is urged to move along the first axis to abut against the first brake pad, the rotation of the first rotating shaft being stopped;

wherein the housing unit includes a base seat, a first side seat that is mounted to the base seat, and a second side seat that is mounted to the base seat and that is spaced apart from the first side seat, the first motor being disposed on the first side seat, the first rotating shaft extending through the first side seat and the second side seat along the first axis, the first encoder being connected to the first rotating shaft and being located in the second side seat.

15. The wrist mechanism as claimed in claim 14, wherein the first brake unit further includes a first coil that is located at one side of the first brake plate opposite to the first brake pad, and a plurality of first resilient members that resiliently push the first brake plate toward the first brake pad, when the first coil is energized, the first coil attracting the first brake plate such that the first brake plate is urged to move away from the first brake pad and compresses the first resilient members, when the first coil is de-energized, the first brake plate being pushed by the first resilient members to move toward the first brake pad along the first axis such that the first brake plate abuts against the first brake pad.

16. The wrist mechanism as claimed in claim 14, wherein the first encoder includes a first code disc that co-rotates with the first rotating shaft, and a first readhead that is disposed on the housing unit and that detects rotation of the first code disc.

17. The wrist mechanism as claimed in claim 14, further comprising a second brake unit, the second rotation unit further including a hollow tube that is connected to the second motor, that extends through the first rotating shaft along the second axis, and that is fixedly connected to the first rotating shaft, a second rotating shaft that is connected to the work platform, that extends through the hollow tube, and that is rotatable relative to the hollow tube, and a second encoder that measures an angle of rotation of the second rotating shaft, and that controls the second motor via closed-loop control, the second brake unit being located at one end of the hollow tube opposite to the second motor, and including a second brake pad that is connected to the second rotating shaft, and a second brake plate that is operable to move relative to the second brake pad along the second axis, when the second brake plate is urged to move along the second axis to abut against the second brake pad, the rotation of the second rotating shaft being stopped.

18. The wrist mechanism as claimed in claim 17, wherein the second brake unit further includes a second coil that is connected to the hollow tube, and a plurality of second resilient members that resiliently push the second brake plate toward the second brake pad, the second coil and the second resilient members being located at one side of the second brake plate opposite to the second brake pad, when the second coil is energized, the second coil attracting the second brake plate such that the second brake plate is urged to move away from the second brake pad and compresses the second resilient members, when the second coil is de-energized, the second brake plate being pushed by the second resilient members to move toward the second brake pad along the second axis such that the second brake plate abuts against the second brake pad.

19. The wrist mechanism as claimed in claim 18, wherein the second brake unit further includes a second mounting seat that is fixedly connected to the hollow tube, a second securing plate that is spaced apart from the second mounting seat along the second axis and that is fixedly connected to the second mounting seat, and a plurality of second guiding rods each of which is disposed between and abuts against the second mounting seat and the second securing plate, the second mounting seat accommodating the second coil and the second resilient members, the second brake pad being located between the second securing plate and the second brake plate, and being spaced apart from the second securing plate, the second brake plate having a plurality of second grooves, the second guiding rods respectively extending through the second grooves.

20. The wrist mechanism as claimed in claim 19, wherein the second encoder includes a second code disc that is mounted to one end of the second rotating shaft opposite to the work platform, and that co-rotates with the second rotating shaft, and a second readhead that is disposed on the second securing plate and that detects rotation of the second code disc.

\* \* \* \* \*